United States Patent
Raupach et al.

(10) Patent No.: US 9,208,586 B2
(45) Date of Patent: Dec. 8, 2015

(54) CT IMAGE RECONSTRUCTION WITH EDGE-MAINTAINING FILTERING

(71) Applicant: SIEMENS AKTIENGESELLSCHAFT, Munich (DE)

(72) Inventors: Rainer Raupach, Heroldsbach (DE); Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 14/036,203

(22) Filed: Sep. 25, 2013

(65) Prior Publication Data

US 2014/0169649 A1 Jun. 19, 2014

(30) Foreign Application Priority Data

Dec. 19, 2012 (DE) .......................... 10 2012 223 745

(51) Int. Cl.
*G06T 11/00* (2006.01)
*G06T 5/20* (2006.01)

(52) U.S. Cl.
CPC ................ *G06T 11/005* (2013.01); *G06T 5/20* (2013.01)

(58) Field of Classification Search
CPC ..... G06T 7/0079; G06T 7/0085; G06T 5/001; G06T 2207/10081; G06T 2207/20221
See application file for complete search history.

(56) References Cited

U.S. PATENT DOCUMENTS

2012/0308100 A1* 12/2012 Pack et al. ..................... 382/131
2013/0028490 A1* 1/2013 Kim et al. ..................... 382/128
2013/0121555 A1 5/2013 Bruder et al.

FOREIGN PATENT DOCUMENTS

DE 102009051634 A1 5/2011
DE 102011086456 A1 5/2013

OTHER PUBLICATIONS

Bildverarbeitung für die Medizin, Kapitel 14.2; Lehmann et al Bildverarbeitung für die Medizin Springer 1997 Kapitel 14.2; 1997; English Translation.
Preconditioning Methods for Improved Convergence Rates in Iterative Reconstructions; Clinthorne et al Preconditioning Methods for Improved Convergence Rates in Iterative Reconstructions IEEE Transactions on Medical Imaging, vol. 12, No. 1, Mar. 1993. S. 78-83; 1993.
Bildverarbeitung für die Medizin, Springer 1997, Kapitel 13.4.3: Rauschunterdrückung; Lehmann et al Bildverarbeitung für die Medizin, Kapitel 13.4.3: Rauschunterdrückung Springer 1997 Seite 346-347; 1997; English Translation.

* cited by examiner

*Primary Examiner* — Amir Alavi
*Assistant Examiner* — Kenny Cese
(74) *Attorney, Agent, or Firm* — Harness, Dickey & Pierce (57) ABSTRACT

A method is disclosed for reconstructing image data of an examination object from measurement data, wherein the measurement data were captured previously during a relative rotational movement between a radiation source of a computed tomography system and the examination object. Filtered measurement data are calculated from the measurement data. First image data are calculated from the measurement data. Edge information is obtained from the first image data, wherein the edge information, depending on position, specifies strength and direction of edges within the first image data. New measurement data are calculated using the edge information by mixing the measurement data and the filtered measurement data and second image data are calculated from the new measurement data.

13 Claims, 3 Drawing Sheets

CT IMAGE RECONSTRUCTION WITH EDGE-MAINTAINING FILTERING

PRIORITY STATEMENT

The present application hereby claims priority under 35 U.S.C. §119 to German patent application number DE 102012223745.3 filed Dec. 19, 2012, the entire contents of which are hereby incorporated herein by reference.

FIELD

At least one embodiment of the invention generally relates to a method for reconstructing image data of an examination object from measurement data, wherein the measurement data were captured previously during a relative rotational movement between a radiation source of a computed tomography system and the examination object.

BACKGROUND

Tomographic imaging methods are distinguished by virtue of the fact that internal structures of an examination object can be examined without, in the process, having to carry out invasive interventions on the latter. A possible type of tomographic image generation consists of recording a number of projections of the object to be examined from different angles. A two-dimensional slice image or a three-dimensional volume image of the examination object can be calculated from these projections.

Computed tomography is an example of such a tomographic imaging method. Various methods for scanning an examination object using a CT system are known. By way of example, circular scans, sequential circular scans with feed or spiral scans are applied. Other types of scans, which are not based on circular movements, are also possible, such as e.g. scans with linear segments. Absorption data of the examination object are recorded from different recording angles with the aid of at least one x-ray source and at least one opposing detector and the absorption data or projections collected thus are calculated by means of appropriate reconstruction methods to form slice images through the examination object.

In order to reconstruct computed tomographic images from x-ray CT data sets of a computed tomography instrument (CT instrument), i.e. from the detected projections, a so-called filtered back projection (FBP) is used these days as standard method. After the data capture, a so-called "rebinning" step is usually carried out, during which the data generated by the beam propagating in a fan-shaped manner from the source are reordered such that they are available in a form as if the detector were hit by x-rays running towards the detector in parallel. The data are then transformed into the frequency space. Filtering takes place in the frequency space and the filtered data are subsequently transformed back. There then is a back projection onto the individual voxels within the region of interest with the aid of the thus re-sorted and filtered data.

The FBP method belongs to the group of approximate reconstruction methods. Furthermore, there is the group of exact reconstruction methods, but these are currently barely used. Finally, iterative methods form a third group of reconstruction methods.

SUMMARY

A method for reconstructing CT images is disclosed, which, in particular, is suitable for image calculation by means of filtered back projection. Furthermore, a corresponding computer unit, a CT system, a computer program and a data medium for a computer program are also disclosed.

Advantageous embodiments and developments are the subject matter of dependent claims.

In the method according to an embodiment of the invention for reconstructing image data of an examination object from measurement data, these measurement data were captured previously during a relative rotational movement between a radiation source of a computed tomography system and the examination object. Filtered measurement data are calculated from the measurement data. Moreover, first image data are calculated from the measurement data. Edge information is obtained from the first image data, wherein the edge information, depending on position, specifies a direction of edges within the first image data. New measurement data are calculated using the edge information by mixing the measurement data and the filtered measurement data, and second image data are calculated from the new measurement data.

The computer unit according to an embodiment of the invention serves for reconstructing image data of an examination object from measurement data of a CT system. It has devices/modules for carrying out the above-described method. In particular, it can comprise program storage for storing program code, wherein here—if need be inter alia—program code of a computer program which is suitable to execute a method of the type described above or to bring about or control this execution when the computer program is executed on a computer is available. The computer unit can also be realized by a plurality of interconnected apparatuses situated at different locations. This corresponds to distributing the functionality of the computer unit onto several components. The computer unit is advantageously additionally able to control a measurement process of the CT system.

The CT system according to an embodiment of the invention comprises an embodiment of a computer unit. Furthermore, it can contain other components which, for example, are required to capture measurement data.

The computer program according to an embodiment of the invention comprises program code which effects the carrying out an embodiment of a method of the type described above when the computer program is executed on a computer.

The data medium according to an embodiment of the invention, which can be read by computer, stores program code of a computer program which effects the carrying out of an embodiment of the method of the type described above when the computer program is executed on a computer. The contactable data medium can in this case be fixedly connected to the computer or be installed in this computer, or else be designed to be removable therefrom. Examples of an installed storage medium are rewritable non-volatile memories such as e.g. ROMs, flash memory and hard disk drive storage. Examples of removable storage media include optical storage media such as CD-ROMs and DVDs, magneto-optical memories such as MOs, magnetic storage media such as floppy disks, cassettes and removable hard disk drive storage, storage media with an installed rewritable non-volatile memory such as e.g. memory cards, memory with an installed ROM such as e.g. ROM cassettes, etc.

BRIEF DESCRIPTION OF THE DRAWINGS

In the following text, the invention will be explained in more detail on the basis of an example embodiment. Here.

DETAILED DESCRIPTION OF THE EXAMPLE EMBODIMENTS

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In the method according to an embodiment of the invention for reconstructing image data of an examination object from measurement data, these measurement data were captured previously during a relative rotational movement between a radiation source of a computed tomography system and the examination object. Filtered measurement data are calculated from the measurement data. Moreover, first image data are calculated from the measurement data. Edge information is obtained from the first image data, wherein the edge information, depending on position, specifies a direction of edges within the first image data. New measurement data are calculated using the edge information by mixing the measurement data and the filtered measurement data, and second image data are calculated from the new measurement data.

Different sets of measurement data are used for calculating the image. On the one hand, the original measurement data are available, which were optionally already subjected to preprocessing. On the other hand, there are filtered measurement data, which were obtained from the measurement data by applying a filter operation. This filtering is preferably a smoothing process. This can serve to remove statistical uncertainties in the measurement data. These uncertainties occur in particular in the case of small measurement values, i.e. in the case of large attenuations.

The measurement data and the filtered measurement data are mixed in order thereby to obtain new measurement data. The new measurement data therefore contain components of both the measurement data and the filtered measurement data. In this case, it is possible that some of the new measurement data are identical to the measurement data or the filtered measurement data. An example of mixing is a weighted summation. Second image data are calculated from the new measurement data and can be output as results image.

In order to calculate the mixture of the measurement data with the filtered measurement data, first image data are initially calculated from the measurement data. The first image data, like the second image data as well, can be a two-dimensional slice image or a three-dimensional volume image of the examination object.

Due to the composition of the measurement data, the first image data can have image aberrations such as e.g. noise. Therefore these are not output as results image. Rather, there is a calculation of the new measurement data, which preferably do not have these aberrations or only have these aberrations to a reduced extent.

The first image data are used to obtain information in respect of edges. Here, an edge is a local strong change in pixel values. This corresponds to an object structure such as e.g. a boundary between material or tissue types. The directions in which the respective edges extend are of interest for the further procedure. Here, the direction of an edge can change within the image; an edge usually does not extend as a straight line through the image. The direction of an edge is therefore generally a variable which depends upon location.

The edge information is used to calculate the mixture of the measurement data and the filtered measurement data. As a result of this, the presence and the direction of an edge can locally decide the mixture ratio.

In a development of an embodiment of the invention, for every pixel in the first image data and relating to the respective pixel for each ray from the radiation source through the respective pixel to a detector element, the new measurement data are calculated by mixing the measurement data and the filtered measurement data. The type of mixing of measurement data and filtered measurement data is therefore not the same for the whole section of interest in the examination object. Rather, a decision can be made locally as to which mixture is the most advantageous. Here, the mixture is calculated ray by ray. Each ray is a connection between the x-ray source and an element of the detector and therefore corresponds to a specific measurement value. Thus, one ray or one measurement value is available for each pixel in each projection. In relation to a specific pixel, all rays of the various projections which run through the respective pixel are required for the image reconstruction.

It is particularly advantageous if a weighting factor is employed during the mixing, which weighting factor contains the edge information and information relating to the direction of the respective ray. As a result of this, the direction of an edge and the direction of the observed ray can be put in relation to one another. Depending on these two variables, a decision can be made as to what the weighting factor should be for the respective pixel and ray. The weighting factor decides what portion the measurement data and the filtered measurement data have in the new measurement data.

In one embodiment of the invention, the weighting factor increasingly prefers the measurement data compared to the filtered measurement data with increasing parallelism between an edge in the surroundings of the respective pixel and the ray direction in the mixture. Thus, it is determined whether an edge extends near to the observed pixel. If this is so, the direction of the edge is determined. The more parallel the edge extends to the respective ray, the larger the portion of the measurement data compared to the filtered measurement data in the new measurement data is. This renders it possible to avoid filtering in the direction perpendicular to the ray, or at least reduce thereof, causing a loss of sharpness in the edge.

Additionally or alternatively, the weighting factor increasingly prefers the filtered measurement data compared to the measurement data with increasing orthogonality between an edge in the surroundings of the respective pixel and the ray direction in the mixture. Thus, the more perpendicular an optionally present edge is in relation to the direction of the observed ray, the larger the portion of the filtered measurement data is compared to the measurement data in the new measurement data. This enables smoothing and hence a noise reduction in the image.

Additionally or alternatively, the edge information, depending on position, specifies the strength of edges within the first image data, and the weighting factor increasingly prefers the measurement data compared to the filtered measurement data with increasing edge strength of an edge in the surroundings of the respective pixel in the mixture. Thus, the strength of the edge is also considered in addition to the direction thereof. The stronger an edge is, the larger the portion of the measurement data is compared to the filtered measurement data in the new measurement data. As a result, as an edge becomes more pronounced, the more strongly said edge can be protected from loss of sharpness due to the filtered measurement data.

Furthermore, it is advantageous if the weighting factor increasingly prefers the filtered measurement data compared to the measurement data with increasing attenuation along the respective ray in the mixture. The more strongly an x-ray is attenuated along the observed ray direction, the smaller the respective measurement value is, and hence the more it is afflicted by statistical error. Hence, it is advantageous to make more use of the filtered measurement data as the attenuation along a specific ray increases. This is because suitable filtering renders it possible to reduce the statistical uncertainties in the measurement data.

In a development of an embodiment of the invention, at least one further set of filtered measurement data is calculated from the measurement data and the new measurement data are calculated using the edge information by mixing the measurement data, the filtered measurement data and the at least one set of further filtered measurement data. This renders possible the use of several filters which have a differently strong effect on the measurement data. Then several weighting factors can be used during the mixing, which weighting factors determine how large the portions of the various measurement data sets are in relation to the new measurement data.

The computer unit according to an embodiment of the invention serves for reconstructing image data of an examination object from measurement data of a CT system. It has devices/modules for carrying out the above-described method. In particular, it can comprise program storage for storing program code, wherein here—if need be inter alia— program code of a computer program which is suitable to execute a method of the type described above or to bring about or control this execution when the computer program is executed on a computer is available. The computer unit can also be realized by a plurality of interconnected apparatuses situated at different locations. This corresponds to distributing the functionality of the computer unit onto several components. The computer unit is advantageously additionally able to control a measurement process of the CT system.

The CT system according to an embodiment of the invention comprises an embodiment of a computer unit. Furthermore, it can contain other components which, for example, are required to capture measurement data.

The computer program according to an embodiment of the invention comprises program code which effects the carrying out an embodiment of a method of the type described above when the computer program is executed on a computer.

The data medium according to an embodiment of the invention, which can be read by computer, stores program code of a computer program which effects the carrying out of an embodiment of the method of the type described above when the computer program is executed on a computer. The contactable data medium can in this case be fixedly connected to the computer or be installed in this computer, or else be designed to be removable therefrom. Examples of an installed storage medium are rewritable non-volatile memories such as e.g. ROMs, flash memory and hard disk drive storage. Examples of removable storage media include optical storage media such as CD-ROMs and DVDs, magneto-optical memories such as MOs, magnetic storage media such as floppy disks, cassettes and removable hard disk drive storage, storage media with an installed rewritable non-volatile memory such as e.g. memory cards, memory with an installed ROM such as e.g. ROM cassettes, etc.

Figure 1:
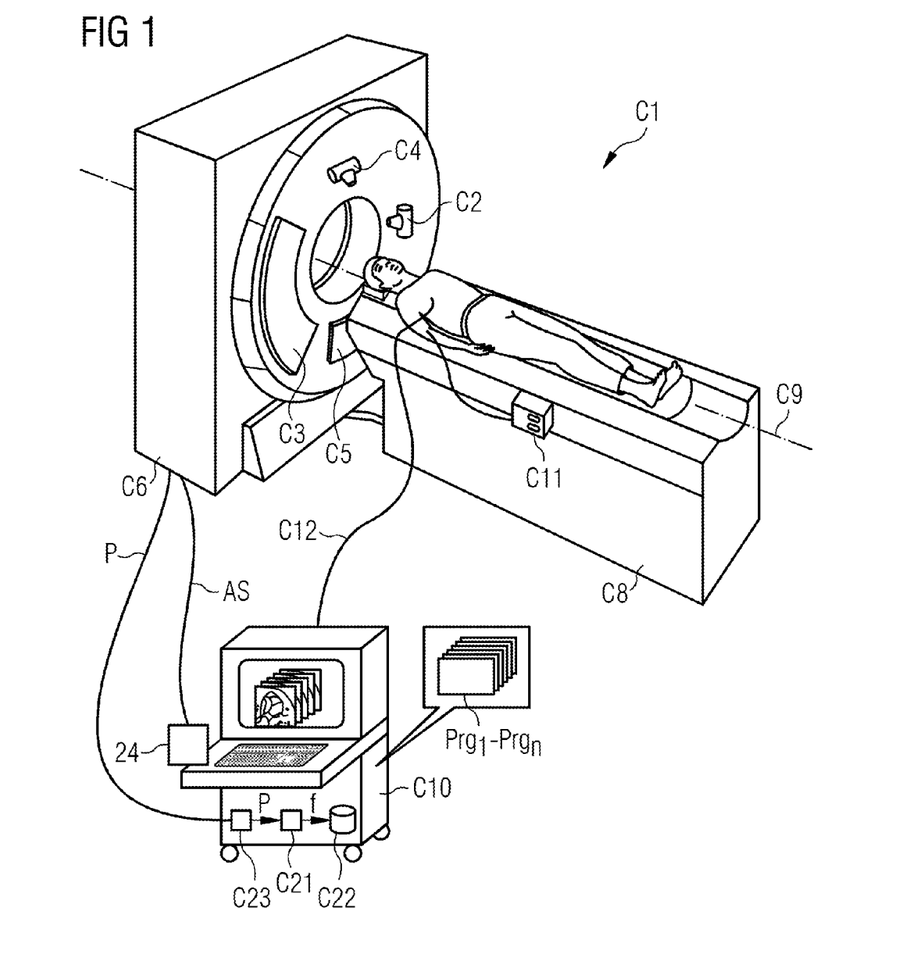
FIG. 1: shows a first schematic illustration of an example embodiment of a computed tomography system with an image reconstruction component.

FIG. 1 initially schematically illustrates a first computed tomography system C1 with an image reconstruction apparatus C21. This is a so-called third-generation CT instrument, but the invention is not restricted thereto. Situated in the gantry housing C6, there is a closed gantry (not visible here), on which a first x-ray tube C2 with an opposing detector C3 is arranged. In the CT system depicted here, a second x-ray tube C4 with an opposing detector C5 is optionally arranged such that a higher time resolution can be achieved by the additionally available emitter/detector combination or that it is also possible to carry out "dual energy" examinations when using different x-ray energy spectra in the emitter/detector systems.

The CT system C1 furthermore comprises a patient couch C8, on which a patient can, during the examination, be pushed into the measurement field along a system axis C9, which is also referred to as z-axis. However, it is also possible that the scan itself occurs as a purely circular scan without feed of the patient and only in the examination region of interest. The movement of the patient couch C8 relative to the gantry is brought about by suitable motorization. During this movement, the x-ray source(s) C2 and/or C4 respectively rotate(s) around the patient. Parallel to this, the detector C3 and C5 respectively also moves opposite to the x-ray source C2 and C4 in order to capture projection measurement data which can then be employed for reconstructing slice images.

As an alternative to a sequential scan, during which the patient is pushed through the examination field step-by-step between the individual scans, the option of a spiral scan is naturally also provided, during which the patient is continuously pushed along the system axis C9 through the examination field between the x-ray tube C2 or C4 and detector C3 or C5 during the circulating scan with the x-ray radiation. As a result of the movement of the patient along the axis C9 and the simultaneous circulation of the x-ray source C2 or C4, this results in a helical path for the x-ray source C2 or C4 relative to the patient during the measurement in the case of a spiral scan. This path can also be achieved by virtue of the fact that the gantry is displaced along the axis C9 while the patient remains stationary. Furthermore, it is possible to move the patient continuously and, if need be, periodically to and fro between two points.

The CT system C1 is controlled by a control and computer unit C10 with computer program code Prg1 to Prgn present in a storage medium. Reference is made to the fact that these computer program codes Prg1 to Prgn can naturally also be contained in an external storage medium and can be loaded into the control and computer unit C10 when required.

Acquisition control signals AS can be transmitted by the control and computer unit C10 via a control interface 24 in order to actuate the CT instrument in accordance with specific measurement protocols. Here, the acquisition control signals AS relate to e.g. the x-ray tubes C2 and C4, wherein prescriptions can be made in respect of the power thereof and the times at which they are turned on and off, and in respect of the gantry, where prescriptions can be made in respect of the rotational speed thereof, and in respect of the table feed.

Since the control and computer unit C10 has an input console, measurement parameters can be entered by a user or operator of the CT instrument, which measurement parameters in the form of acquisition control signals AS then control the data capture. Information in respect of currently used measurement parameters can be displayed on the monitor of the control and computer unit C10; additionally, further information relevant to the operator can be displayed.

The projection measurement data p or raw data acquired by the detector C3 and/or C5 are transmitted to the control and computer unit C10 by a raw data interface C23. These raw data p are then, optionally after suitable preprocessing, processed further in an image reconstruction component C21. The image reconstruction component C21 is realized in the control and computer unit C10 in the form of software on a processor in this example embodiment, for example in the form of one or more of the computer program codes Prg1 to Prgn. As already explained above in relation to the control of the measurement process, what applies in relation to the image reconstruction is that the computer program codes Prg1 to Prgn can also be contained in an external storage medium and can be loaded into the control and computer unit C10 when required. Furthermore, it is possible that the control of the measurement process on the one hand and the image reconstruction on the other hand is carried out by different computer units.

The image data f reconstructed by the image reconstruction component C21 are then stored in a storage medium C22 of the control and computer unit C10 and/or output in a conventional manner on the monitor of the control and computer unit C10. They can also be fed into a network, e.g. a radiological information system (RIS), connected to the computed tomography system C1 via an interface (not illustrated in FIG. 1) and stored in a mass storage accessible there or output as images.

The control and computer unit C10 can additionally also carry out the function of an EKG, wherein a line C12 is used for carrying the EKG potentials between patient and control and computer unit C10. Additionally, the CT system C1 shown in FIG. 1 also has a contrast agent injector C11, by means of which contrast agent can additionally be injected into the bloodstream of the patient such that e.g. the vessels of the patient, in particular the heart chambers of the beating heart, can be displayed in an improved fashion. Moreover, this renders it possible to carry out perfusion measurements, for which the proposed method is likewise suitable.

Naturally, the control and computer unit C10 need not—unlike the illustration of FIG. 1—be situated in the vicinity of the remaining components of the CT system C1. Rather, it is possible to house these in a different room or at a location further away. The transmission of the raw data p and/or the acquisition signals AS and/or the EKG data can be brought about by a line or, alternatively, by radio link.

Figure 2:
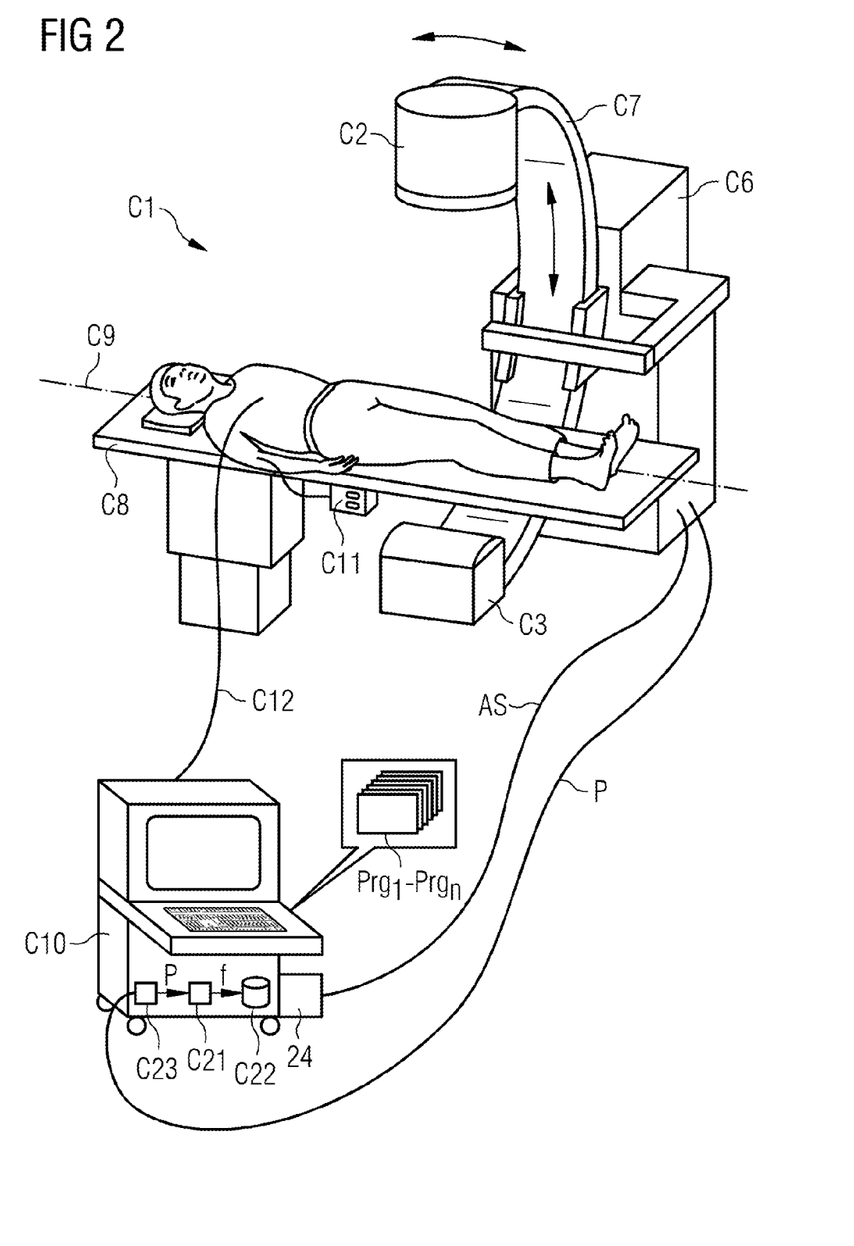
FIG. 2: shows a second schematic illustration of an example embodiment of a computed tomography system with an image reconstruction component.

FIG. 2 shows a C-arm system, in which, in contrast to the CT system in FIG. 1, the housing C6 carries the C-arm C7, on which, firstly, the x-ray tube C2 and, secondly, the opposing detector C3 are attached. For scanning, the C-arm C7 is likewise swiveled about a system axis C9 such that scanning can take place from a multiplicity of scanning angles and corresponding projection data p can be established from a multiplicity of projection angles. The C-arm system C1 in FIG. 2, like the CT system in FIG. 1, comprises a control and computer unit C10 of the type described in relation to FIG. 1.

Embodiments of the invention can be applied to both of the systems shown in FIGS. 1 and 2. Furthermore, in principle, it can also be used in other CT systems, e.g. in CT systems with a detector which forms a complete ring.

In many image reconstruction methods, a summation of the measurement values of all rays which extend through the respective pixel is carried out for calculating a pixel value. This is an inverse Radon transform, which, in particular, is also employed in the filtered back projection (FBP). Practically all reconstruction methods not working on iterative principles are based on this principle.

Here, a ray is understood to mean a connection between the x-ray source and a detector element, which extends at least in part through the examination object. Thus, at a specific projection angle, a ray from the x-ray source to the respective detector element exists for each element of the detector.

The various rays which contribute to a pixel can have very different levels of attenuation. This can be seen immediately if strongly attenuating components are present in the examination object, such as e.g. in the case of metal implants. However, this already holds true in the center of the examination object in the case of elliptical examination objects as well. Strong attenuation and hence a small measurement value in this case means that the respective measurement value is afflicted by much larger statistical inaccuracy than a large measurement value. Without further measures which take this into account, there is an anisotropic noise structure right up to noise stripes along the directions with large attenuation in the resulting CT images. The noise stripes are created because the effect is not only local i.e. restricted to individual pixels, in the case of a strongly attenuated ray. Rather, all pixels along the respective ray are subjected to this problem.

It is therefore desirable to subject the measurement values to filtering, with the statistically inaccurate measurement values being afforded a lower weighting. However, it should be noted that the inverse Radon transform requires an equal weighting of all rays that extend through a pixel. In order to tackle this problem, there already are known procedures:

1) The measurement values are filtered in an attenuation-dependent manner prior to the reconstruction such that data with greater attenuation are smoothed more strongly. To this end, low-pass filters which carry out averaging over adjacent rays can be employed. As a result of this, the image noise becomes isotropic. However, a disadvantage herein is that the images lose sharpness orthogonally to the directions of the rays with the greater attenuation. This is due to the fact that the filters act perpendicular to the beam direction.

2) There are various methods for statistical iterative image reconstruction, for example described in N. H. Clinthorne, T-S Pan, P-C Chiao, L. Rogers, J. A. Stamos: "Preconditioning Methods for Improved Convergence Rates in Iterative Reconstructions", IEEE Trans. on Medical Imaging 12, p. 78 (1993), the entire contents of which are hereby incorporated herein by reference.

In this method there is filtering as described in 1) prior to the step of image calculation. The error caused hereby compared to image calculation without filtering is removed iteratively by a regularization term. However, a disadvantage of the iterative image reconstruction methods is that these are very computationally intensive and therefore require much time. The reason for this lies in the slow convergence which emerges from the small weightings of the rays with large attenuation.

Figure 3:
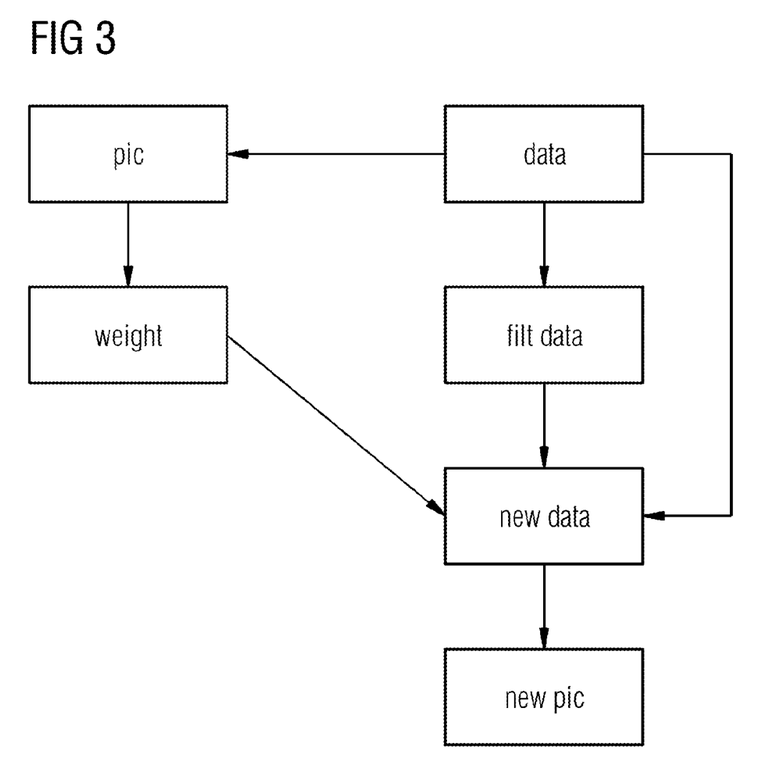
FIG. 3: shows a flowchart.

The following describes how the disadvantages of the methods described under 1) and 2) can be avoided by way of an edge-maintaining filter. To this end, FIG. 3 shows a flowchart.

The measurement values data are initially available after the CT measurement. These can be already preprocessed data; however, they have not yet been smoothed in order to compensate for the above-described statistical disadvantages of the rays with high attenuation.

The measurement values data are used as a basis for such filtering in which the filtered data filt data are obtained as a result. The filtering is attenuation-dependent or signal-dependent. That is to say, the smallest measurement values, corresponding to the rays with the largest attenuation, are processed the most by the filtering. As a result of the filtering, a new measurement value is calculated for a specific ray by virtue of the original measurement value thereof being linked with the measurement values for the adjacent rays. During this linking, weightings are employed for the measurement values of the various rays, wherein a ray with a large attenuation is provided with a low weighting. This linking can take place in a one-dimensional manner in the direction of the channel; this corresponds to the case explained above where the smoothing and hence the loss of sharpness in the image occurs in a direction perpendicular to the beam. Alternatively, there can also be two-dimensional filtering in channel and line direction. (The line direction extends along the axis of symmetry or the axis of rotation of the CT system, the channel or column direction is perpendicular thereto. The extent of the detector in the line direction is usually much smaller than in the channel direction.) Time can be used as a further dimension of the filtering; in this case, filtering is carried out over various projections.

Compared to the original measurement values data, the filtered measurement values filt data are advantageous in that they lead to an image with lower noise since the filtering improves the statistical properties of the measurement values. However, it is disadvantageous that the resulting image has reduced sharpness, as already explained above.

Examples of suitable filters can be found e.g. in the book by T. Lehmann, W. Oberschelp, E. Pelikan, R. Repges, Bildverarbeitung für die Medizin [Image processing for medicine], Springer 1997, chapter 13.4.3), the entire contents of which are hereby incorporated herein by reference. By way of example, a binomial filter mentioned there is suitable.

An image pic is reconstructed from the original measurement data. This image pic serves to determine weightings weight, the use of which will still be explained below. To this end, what is determined first is where edges are situated within the image pic and in which directions these edges extend. Here, an edge is understood to mean an image region with a strong change in the pixel values, i.e. with a large gradient in the pixel values. By way of example, this applies to e.g. the edges of lesions or the boundaries between various materials/tissue types.

Different methods can be considered for finding edges. What is easiest is to determine the numerical difference between the pixel values locally. A large difference corresponds to the presence of an edge at the respective point. Such procedures are described e.g. in the book by T. Lehmann, W. Oberschelp, E. Pelikan, R. Repges, Bildverarbeitung für die Medizin [Image processing for medicine], Springer 1997, chapter 14.2), the entire contents of which are hereby incorporated herein by reference.

After analyzing the edges, it is now known for each pixel of the image pic as to whether it is situated in the vicinity of an edge and, if applicable, in which direction the respective edge extends.

For each pixel, the product $\vec{t}\cdot\vec{n}$ is now determined for each ray which passes through this pixel. This means that this consideration takes place for each recorded projection. Here, $\vec{t}$ is a unit vector which is perpendicular to the respective ray. Here, $\vec{n}$ is a vector which describes an edge situated in the vicinity of the pixel: it is perpendicular to the edge and the value thereof increases the more strongly the edge is pronounced.

$\lambda = e^{-c\cdot|\vec{t}\cdot\vec{n}|}$ is now calculated from the product $\vec{t}\cdot\vec{n}$. Here, c is a constant which can be determined empirically. The variable $\lambda = e^{-c\cdot|\vec{t}\cdot\vec{n}|}$ is the sought after weighting weight. It is used to determine what mixing ratio should be used for the new measurement value new data at the respective pixel and for the respective ray:

$$\text{new data} = (1-\lambda)\cdot\text{data} + \lambda\cdot\text{filt data} \quad \text{Equation (1)}$$

Thus, for each pixel, a new measurement value new data is calculated for each ray which passes through this pixel and hence is required during the summation for the image reconstruction. This calculation is a mixture of the respectively original measurement value data and the filtered measurement value filt data. The weighting $\lambda$ constitutes a weighting factor which decides how large the components of the original measurement value data and of the filtered measurement value filt data are in relation to the new measurement value new data.

The effect of $\lambda$ is the following:

if the respective ray and an edge situated in the vicinity extend parallel to one another, the product $\vec{t}\cdot\vec{n}$ is large, and so $\lambda = e^{-c\cdot|\vec{t}\cdot\vec{n}|}$ is small. It therefore follows from equation (1) that it is mainly the original measurement value data which contributes to the new measurement value new data at the respective pixel and for the respective ray. This applies even more so, the more strongly pronounced the edge is. This procedure is advantageous since, as already explained above, filtering leads to smoothing in the direction perpendicular to the beam. However, if an edge is situated here, smoothing is disadvantageous since otherwise the sharpness of the edge in the image would be lost.

if there is no edge in the vicinity of the pixel, zero is inserted for $\vec{n}$, and so the product $\vec{t}\cdot\vec{n}$ is zero which is why $\lambda = e^{-c\cdot|\vec{t}\cdot\vec{n}|}$ is 1. In accordance with equation (1), this results in the new measurement value new data being equal to the filtered measurement value filt data. Hence noise is smoothed at this point. This is advantageous since there is no structure whose sharpness would be lost by smoothing in the vicinity of the pixel.

if there is an edge extending perpendicular to the respective ray in the vicinity of the pixel, the product $\vec{t}\cdot\vec{n}$ is zero which is why $\lambda = e^{-c\cdot|\vec{t}\cdot\vec{n}|}$ is 1. In accordance with equation (1), this results in the new measurement value new data being equal to the filtered measurement value filt data. Hence, noise is smoothed at this point. This does not cause harm since filtering has no effect perpendicular to the ray.

A specific distance is set in order to answer the question as to whether a present edge is situated in the vicinity of a pixel or whether it is already outside of the vicinity of the pixel. This distance should correspond to the length scale of the effect of the smoothing by the filtering. By way of example, if the filtering develops its effect over e.g. 2 mm, it is expedient to define a distance of approximately 2 mm. If a pixel is within this distance from an edge, it counts as being situated in the vicinity of this edge. If it is further from all edges than this distance, it no longer counts as being situated in the vicinity of an edge.

As an extension to what was described above, it is possible, instead of a unit vector, to use a vector for $\vec{t}$ which is perpendicular to the respective ray and which has a specific length. This length is inversely proportional to the standard deviation of the measurement value data of the beam. This in turn is proportional to the exponential function of the line integral of the attenuation along the respective ray. This means that the length of $\vec{t}$ reduces with increasing attenuation of the considered ray—this corresponds to a decreasing measurement value data. Hence, the less statistically reliable the respective measurement value is, the smaller the length of $\vec{t}$ and hence the product $\vec{t}\cdot\vec{n}$ becomes. In the case of a presence of an edge not extending in the perpendicular direction, this leads to a larger deviation of $\lambda = e^{-c\cdot|\vec{t}\cdot\vec{n}|}$ from the value 1, and so the portion of the filtered measurement values filt data increases in the new measurement values new data.

If the measurement values have a large spectrum of statistical behavior, i.e. if variances with very different magnitudes are present, it is advantageous to apply different filters to the measurement values. This corresponds to the calculation of a plurality of sets of filtered measurement values filt data. By way of example, as a result of this, it is possible to employ a first filter, which only smoothes weakly, and a second filter which smoothes strongly. Equation (1) is then modified to the extent that not one $\lambda$ is used, but rather that several of such weighting factors are employed such that there is a mixture of the plurality of sets of filtered measurement values filt data with the original measurement values data. As a result of this, it is then possible to distinguish e.g. between very little, little and much noise compared to the strength of the edge, and the mixture can be composed accordingly. In the case of very little noise, it would mainly be the unfiltered measurement values which contribute to the new measurement values new data, in the case of little noise this would be the weakly filtered measurement values and in the case of strong noise this would be the strongly filtered measurement values.

As a result of this, a new measurement value new data is determined for each pixel and for each ray extending through the respectively considered pixel. The image new pick is then calculated on the basis of these new measurement values new data. Thus, a mixture of filtered and unfiltered measurement values is used in this case for the back projection, to be precise in accordance with equation (1). Here, the mixture is dependent on the edge information at the respective pixel and the projection direction of the back-projected ray.

If only the filtered measurement values filt data were to be used for image reconstruction, what these would bring about is that there is smoothing and hence a loss of sharpness for the respective direction in the whole image. By contrast, what the application of equation (1) brings about is that information is used from the image space in order to carry out selective filtering of the measurement values dependent thereon.

The above-described method is superior to the previously known methods since the location and ray direction dependent filtering of the measurement values avoids loss of sharpness of object structures. In contrast to the iterative image reconstruction, the computational complexity is significantly smaller. Although the new measurement values new data have to be calculated, this requires significantly less computational complexity than the calculation of a forward and back projection in the case of the iterative image reconstruction.

The example embodiments described above relate to the medical applications of the invention. However, the invention can also be employed outside of medicine, for example when monitoring baggage or in materials testing.

The invention was described above on the basis of an example embodiment. It is understood that numerous changes and modifications are possible without departing from the scope of the invention.

What is claimed is:

1. A method for reconstructing image data of an examination object from measurement data, the measurement data being data captured during a relative rotational movement between a radiation source of a computed tomography system and the examination object, the method comprising:
    calculating filtered measurement data from the measurement data;
    calculating first image data from the measurement data;
    obtaining edge information from the first image data, wherein the edge information, depending on position, specifies a direction of edges within the first image data;
    calculating, for every pixel in the first image data and relating to a respective pixel for each ray from the radiation source through the respective pixel to a detector element, new measurement data using the edge information by mixing the measurement data and the filtered measurement data using a weighting factor, the weighting factor containing the edge information and information relating to the direction of the respective ray; and
    calculating second image data from the new measurement data.

2. The method of claim 1, wherein the weighting factor increasingly prefers the measurement data compared to the filtered measurement data with increasing parallelism between an edge in the surroundings of the respective pixel and the ray direction in the mixture.

3. The method of claim 2, wherein the weighting factor increasingly prefers the filtered measurement data compared to the measurement data with increasing orthogonality between an edge in the surroundings of the respective pixel and the ray direction in the mixture.

4. The method of claim 2, wherein the edge information, depending on position, specifies the direction and strength of edges within the first image data, the weighting factor increasingly prefers the measurement data compared to the filtered measurement data with increasing edge strength of an edge in the surroundings of the respective pixel in the mixture.

5. The method of claim 3, wherein the edge information, depending on position, specifies the direction and strength of edges within the first image data, the weighting factor increasingly prefers the measurement data compared to the filtered measurement data with increasing edge strength of an edge in the surroundings of the respective pixel in the mixture.

6. The method of claim 1, wherein the weighting factor increasingly prefers the filtered measurement data compared to the measurement data with increasing orthogonality between an edge in the surroundings of the respective pixel and the ray direction in the mixture.

7. The method of claim 1, wherein the edge information, depending on position, specifies the direction and strength of edges within the first image data, the weighting factor increasingly prefers the measurement data compared to the filtered measurement data with increasing edge strength of an edge in the surroundings of the respective pixel in the mixture.

8. The method of claim 1, wherein the weighting factor increasingly prefers the filtered measurement data compared to the measurement data with increasing attenuation along the respective ray in the mixture.

9. The method of claim 1, wherein the filtered measurement data are calculated by virtue of the measurement data being subjected to smoothing.

10. The method of claim 1, wherein at least one further set of filtered measurement data is calculated from the measurement data, the new measurement data are calculated using the edge information by mixing the measurement data, the filtered measurement data and the at least one further set of filtered measurement data, and the second image data are calculated from the new measurement data.

11. A computer unit for reconstructing image data of an examination object from measurement data of a CT system, the measurement data being data captured during a relative rotational movement between a radiation source of a computed tomography system and the examination object, the computer unit being configured to at least:
    calculate filtered measurement data from the measurement data;
    calculate first image data from the measurement data;
    obtain edge information from the first image data, wherein the edge information, depending on position, specifies a direction of edges within the first image data;
    calculate, for every pixel in the first image data and relating to a respective pixel for each ray from the radiation source through the respective pixel to a detector element, new measurement data using the edge information by mixing the measurement data and the filtered measurement data using a weighing factor, the weighting factor containing the edge information and information relating to the direction of the respective ray; and
    calculate second image data from the new measurement data.

12. A CT system comprising the computer unit of claim 11.

13. A non-transitory computer readable medium comprising program code of a computer program, to carry out the method of claim 1 when the computer program is executed on a computer.

* * * * *